(12) United States Patent
Sander et al.

(10) Patent No.: US 10,868,816 B2
(45) Date of Patent: Dec. 15, 2020

(54) COMMUNITIES ON A SECURITY INFORMATION SHARING PLATFORM

(71) Applicant: ENTIT SOFTWARE LLC, Sanford, NC (US)

(72) Inventors: Tomas Sander, Princeton, NJ (US); Terence Spies, Cupertino, CA (US); Susan K. Langford, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 129 days.

(21) Appl. No.: 16/070,866

(22) PCT Filed: Jan. 29, 2016

(86) PCT No.: PCT/US2016/015636
§ 371 (c)(1),
(2) Date: Jul. 18, 2018

(87) PCT Pub. No.: WO2017/131739
PCT Pub. Date: Aug. 3, 2017

(65) Prior Publication Data
US 2019/0036938 A1    Jan. 31, 2019

(51) Int. Cl.
*G06F 21/00*    (2013.01)
*H04L 29/06*    (2006.01)
(Continued)

(52) U.S. Cl.
CPC ............ *H04L 63/102* (2013.01); *G06F 21/31* (2013.01); *G06F 21/56* (2013.01); *G06F 21/604* (2013.01);
(Continued)

(58) Field of Classification Search
CPC ... H04L 63/065; H04L 63/08; H04L 63/0807; H04L 63/0823; H04L 63/083;
(Continued)

(56) References Cited

U.S. PATENT DOCUMENTS 8,397,056 B1    3/2013 Malks et al.
2003/0158897 A1    8/2003 Ben-Natan et al.
(Continued)

FOREIGN PATENT DOCUMENTS

WO    WO-2016/014030 A1    1/2016

OTHER PUBLICATIONS

International Searching Authority., International Search Report and Written Opinion dated Oct. 18, 2016 for PCT Application No. PCT/US2016/015636 Filed Jan. 29, 2016, 10 pages.
(Continued)

*Primary Examiner* — Edward Zee (57) ABSTRACT

Examples disclosed herein relate to generating communities on a security information sharing platform. Some examples may enable identifying a set of community attributes to be used to generate a community on the security information sharing platform that enables sharing of security information among a plurality of communities. Some examples may enable authorizing a first user to access community-based security information of the community where the first user is associated a set of user attributes that satisfy the set of community attributes. A security indicator may be obtained from the first user of the community. Information related to the security indicator may be obtained from a second user of the community. Some examples may enable including the security indicator and the information related to the security indicator in the community-based security information of the community.

15 Claims, 5 Drawing Sheets

(51) Int. Cl.
*G06F 21/56* (2013.01)
*G06F 21/31* (2013.01)
*G06F 21/60* (2013.01)
*G06F 21/62* (2013.01)

(52) U.S. Cl.
CPC ...... *G06F 21/6218* (2013.01); *H04L 63/1441* (2013.01); *H04L 63/20* (2013.01); *G06F 2221/2141* (2013.01)

(58) Field of Classification Search
CPC ..... H04L 63/10; H04L 63/102; H04L 63/104; H04L 63/105; H04L 63/107
See application file for complete search history.

(56) References Cited

U.S. PATENT DOCUMENTS

| | | | |
|---|---|---|---|
| 2005/0022132 A1 | 1/2005 | Herzberg et al. | |
| 2007/0245002 A1 | 10/2007 | Nguyen et al. | |
| 2008/0127306 A1* | 5/2008 | Blumfield | H04L 63/1441 726/3 |
| 2009/0013041 A1* | 1/2009 | Farmer | G06Q 10/06 709/204 |
| 2009/0077480 A1 | 3/2009 | Caunter et al. | |
| 2015/0207813 A1* | 7/2015 | Reybok | H04L 63/145 726/22 |

OTHER PUBLICATIONS

Li, B., et al., An Efficient and Anonymous Attribute-based Group Setup Scheme, Globecom 2013—Communication and Information System Security Symposium, Dec. 9-13, 2013, 6 pages.

Schechter, S., et al., Anonymous Authentication of Membership in Dynamic Groups, Retrieved from the Internet: <http://cgs.csail.mit.edu/pubs/fc99lncs.pdf>, Feb. 1, 1999 12 pages.

Yu, S., et al., Attribute-based On-demand Multicast Group Setup with Membership Anonymity, SecureComm 2008, Sep. 22-25, 2008, 6 pages.

Zhang, Y., et al. Community-based Secure Information and Resources Sharing in AWS Public Cloud, Retrieved from the Internet: <http://www.profsandhu.com/confmc/misconf/cic15-aws-pre.pdf> [retrieved on Nov. 25, 2015], 8 pages.

Sandhu, Ravi et al.; "RT-Based Administrative Models for Community Cyber Security Information Sharing"; 7th International Conference on Collaborative Computing: Networking, Applications & Worksharing, Collaborate.com; Orlando Fl.; Oct. 5-18, 2011; 6 pp.

* cited by examiner

COMMUNITIES ON A SECURITY INFORMATION SHARING PLATFORM

BACKGROUND

Users of a security information sharing platform share security indicators, security alerts, and/or other security-related information (e.g., mitigations strategies, attackers, attack campaigns and trends, threat intelligence information, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security indicators, security alerts, and/or other information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus.

A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community.

In some instances, a community may also be a private community with a limited number of selected users. A private community may be defined by explicitly enumerating its members by, for example, selecting a particular set of users of the security information sharing platform. However, it is not an easy task to identify and/or add each individual user to be included if a large number of users were to be added to the community. Further, a community built based on enumerating individual community members usually comprises a close net of users who already know each other, which decreases a likelihood of receiving information that is not readily available to the users otherwise (e.g., information from other users outside of their existing network).

Examples disclosed herein provide technical solutions to these technical challenges by generating a community based on a particular of set of community attributes that describe users to be included in the community. In this way, a community may be generated based on attributes characterizing its members rather than explicitly enumerating each individual member. Some examples may enable identifying a set of community attributes to be used to generate a community on the security information sharing platform that enables sharing of security information among a plurality of communities. Some examples may enable authorizing a first user to access community-based security information of the community where the first user is associated a set of user attributes that satisfy the set of community attributes. A security indicator may be obtained from the first user of the community. Information related to the security indicator may be obtained from a second user of the community. Some examples may enable including the security indicator and the information related to the security indicator in the community-based security information of the community.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
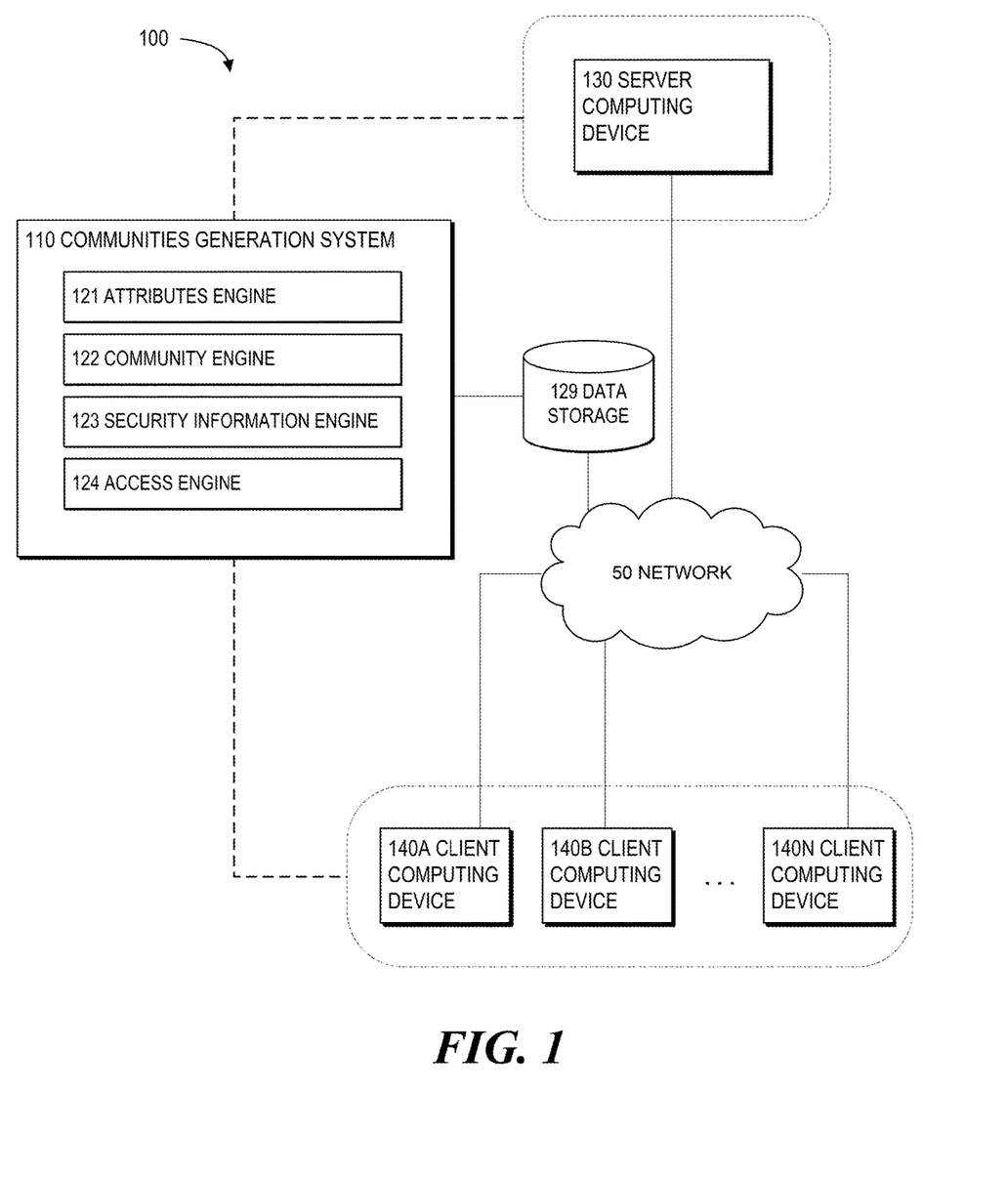
FIG. 1 is a block diagram depicting an example environment in which various examples may be implemented as a communities generation system.

FIG. 1 is an example environment 100 in which various examples may be implemented as a communities generation system 110. Environment 100 may include various components including server computing device 130 and client computing devices 140 (illustrated as 140A, 140B, ..., 140N). Each client computing device 140A, 140B, ..., 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, communities generation system 110 and the various components described herein may be implemented in hardware and/or a combination of hardware and programming that configures hardware. Furthermore, in FIG. 1 and other Figures described herein, different numbers of components or entities than depicted may be used.

Communities generation system 110 may comprise an attributes engine 121, a community engine 122, a security information engine 123, an access engine 124, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Attributes engine 121 may manage and/or store, in a database (e.g., data storage 129), various user attributes associated with a user of the security information sharing platform. As used herein, a "user attribute" may refer to a characteristic and/or property of the user with which the user attribute is associated.

Various user attributes associated with a user may comprise an attribute related: an industry sector of the user (e.g., a financial industry, healthcare industry, etc.), a geographical region Hof the user (e.g., a geographical region where the user is located in), an organization that the user belong to (e.g., a name, size, threat profile and/or any other information about the organization such as an employer, a standards organization, etc.), user reputations of the user (e.g., a user level or badge status of the user such as "Trusted User," "Malware Expert Level V," "Forensics Expert," "High Performer," etc.), a citizenship status of the user, an environmental condition (e.g., terrorist threat level of the geographical region of the user, etc.), an indication of whether the user represents a threat intelligence feed vendor, a security clearance level of the user, user status of the user in the security information sharing platform (e.g., paid subscription level to the security information sharing platform such as Silver status, Platinum status, Gold status, etc.), etc.

User attributes may be assigned to, therefore be associated with, a user in various ways. In one example, the user may specify a user attribute that describes that user by providing information to the security information sharing platform regarding the user's organization, geographical region, expertise, etc. In another example, a user attribute may be automatically extracted from a user profile of the user. A user profile may be created within the security information sharing platform for internal use. In some instances, a user profile that has been externally created may be imported into the security information sharing platform. User attributes included in the user profile may be extracted, parsed, and/or stored in a database (e.g., data storage 129). In yet another example, another user may be allowed to assign a user attribute to the user. In this example, a third-party user may be delegated an authority to assign a user attribute to the user (e.g., a reseller of a product may designate user attributes to its customers).

In some implementations, use attributes that are associated with a user may be hidden from the user. The security information sharing platform may store (e.g., in a data storage 129) a set of user attributes, a user identification of the user, and/or associations thereof, but it may be configured not to reveal the associations to the user.

In some implementations, a certain collection of user attributes may form a set of community attributes to be used to generate a particular community. "A set of community attributes," as used herein, may refer to a particular collection and/or assembly of user attributes that describe users to be included in a particular community. For example, a set of community attributes may be in form of monotonic expression. It may be expressed as: "Top 10 US Bank" AND "Security Clearance." Any users associated with a first user attribute (e.g., "TOP 10 US Bank") and a second user attribute (e.g., "Security Clearance") would satisfy this set of community attributes. Another example set of community attributes may comprise: ("Top 10 US Bank" AND "Security Clearance") OR "China". Note that a user that is not associated with the user attribute "China" may still satisfy this set of community attributes as long as the user is associated with "Top 10 US Bank" and "Security Clearance." In some situations, a set of community attributes may be expressed in such a way that it includes a negation such as: ("Top 10 US Bank" AND "Security Clearance") NOT "Russia". In this case, a user that is associated with "Russia" may not satisfy the set of community attributes as defined.

In some implementations, the set of community attributes may be used as a name and/or label for the community being generated based on that set of community attributes. In this way, by simply looking at the name and/or label, the type of the community can be easily identified.

Community engine 122 may generate a community on the security information sharing platform. The generation of the community may be user-initiated or system-initiated. In some implementations, a user (e.g., a case initiator) may create the community by providing a list of users to be included in the community (e.g., explicitly enumerating a particular set of users). A user (e.g. a case initiator) may create a community in an implicit way by defining a set of community attributes characterizing its members/users rather than explicitly enumerating each individual member/user to be included. In this way, if a large number of users with a common set of characteristics were to be added to the community, it may be more effective to create a community based on a set of community attributes.

In some implementations, the security information sharing platform may automatically identify and/or invite users who might be interested in joining the community based on information that have been collected about users of the platform (e.g., the platform may automatically identify and/or invite users who have been under similar security threats in the past). In some instances, a set of community attributes (e.g., "Banks" AND "US") may be automatically determined based on a certain triggering event (e.g., a serious threat noticed in banks in US). In this case, users associated with a set of user attributes that would satisfy the set of community attributes may join the community (e.g., the community generated based on "Banks" AND "US").

In some implementations, once the set of community attributes are defined (e.g., whether user-initiated or system-initiated), community engine 122 may notify users associated with user attributes that would satisfy the set of community attributes. Users may be asked to confirm (e.g., accept or reject) the invitation to join the community.

In some implementations, an identification of one user of the community may be kept hidden from another user of the same community. The user may choose to voluntarily reveal the user's identity (e.g., add it to the community member list) or keep it anonymous.

Security information engine 123 may obtain a security indicator for the community (e.g., generated by community engine 122 as discussed herein). The security indicator may comprise at least one observable. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but are not limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entities. For example, the plurality of source entities may include a user. A security indicator may be manually created and/or added to the security information sharing platform (e.g., and/or to a particular community in the platform) by the user. In another example, the plurality of source entities may include a threat intelligence provider that provides threat intelligence feeds. A security indicator that is found in the intelligence feeds, for example, may be created and/or added to the security information sharing platform (e.g., and/or to a particular community in the platform). There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria.

"Information" related to a security indicator, as used herein, may comprise information about: an investigation result that is provided by a user of the community, an indicator score for the security indicator, a source entity for the security indicator, a threat actor (e.g., attacker) for the security indicator, a level of confidence (e.g., the level of confidence that the indicator is actually malicious), a level of severity (e.g., the level of severity or likely impact that the indicator may pose), a sighting of an observable of the security indicator, and/or other information related to the security indicator.

In some implementations, security information engine 123 may obtain a security indicator for the community and/or include the security indicator (and/or information related to the security indicator) in community-based security information of that community. The "community-based security information," as used herein, may refer to any security indicators, information related to those security indicators, information related to the community, or any other information originated from (and/or submitted to the community) by a user of that community. For example, a user of the community may create and/or submit the security indicator to the community using the security information sharing platform. The user when creating the security indicator may specify some information related to the security indicator such as a level of confidence associated with the security indicator (e.g., the level of confidence that the indicator is actually malicious) and/or a level of severity (e.g., likely impact) associated with the security indicator (e.g., the level of severity or likely impact that the indicator may pose), and/or other information the user is aware of about the security indicator.

In some implementations, security information engine 123 may provide the security indicator to the community to obtain additional information about the security indicator from the users of the community. For example, a user of the community may create a new security indicator using the security information sharing platform and/or submit it to the community so that other users of the community may collaboratively investigate the security indicator and provide their input. In doing so, security information engine 123 may present, via a user interface (e.g., of the security information sharing platform), the security indicator to the users of the community. A user of the community may investigate the security indicator being presented, assess the reliability of the source entity of the indicator, the level of confidence, and/or the level of severity, report a sighting of an observable (e.g., a sighting indicating that the user observed the observable), provide information about a potential threat actor (e.g., attacker) behind the security indicator, etc. The security indicator along with any associated information may be included and/or stored as part of the community-based security information of that community.

In some implementations, the community may choose to keep the security indicator (and/or associated information) private within the community or selectively share the security indicator (and/or associated information) with the security sharing platform, another community, and/or another user. The community-based security information that is kept private within the community may be accessed by the users who belong to that community but may not be accessible by or visible to the security information sharing platform, another community, and/or another user. In some situations, a case initiator who defined a set of community attributes to create a community may not be associated with user attributes that satisfy the set of community attributes. In other words, although the community is created by the case initiator, the case initiator is not part of the community and therefore is not given access to the community-based security information of that community. To authorize the case initiator (and/or any other users outside of the community) to access at least a portion of the community-based security information of that community, the community members (or at least some portion of the community members) may decide on whether to grant access to the case initiator (and/or any other users outside of the community). For example, it may be determined based on a result of voting by the members of the community (or at least some portion of the community members).

Access engine 124 may receive, from a user, a request to access the community-based security information of the community. "Access," as used herein, may refer to an ability to view/read, add, modify, delete, or a combination thereof. Upon receiving the request, access engine 124 may determine whether the community-based security information of the community should be accessible by that user. In the case that the community is generated based on a set of community attributes (e.g., as discussed herein with respect to community engine 122), this may depend on the determination of whether the user is associated with a set of user attributes that would satisfy the set of community attributes. In some situations, the user credentials (e.g., login and/or password) of the user may already be associated with the set of user attributes of that user. Thus, when the user is logged into the security information sharing platform, the user may automatically gain access to the community-based security information of the community.

In response to determining that the community-based security information of the community is accessible by the user (e.g., from which the request to access was received), access engine 124 may authorize the user to access the community-based security information of the community. If authorized to access the community-based security information of the community, the user may view/read, add modify, and/or delete information from the community-based security information (e.g., submit a security indicator, submit information related to the security indicator, or otherwise collaborate with other users in the community, as discussed herein with respect to community engine 122). On the other hand, in response to determining that the community-based security information of the community is not accessible by the user, access engine 124 may prevent that user from accessing the community-based security information of the community.

In performing their respective functions, engines 121-124 may access data storage 129 and/or other suitable database(s). Data storage 129 may represent any memory accessible to communities generation system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Communities generation system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
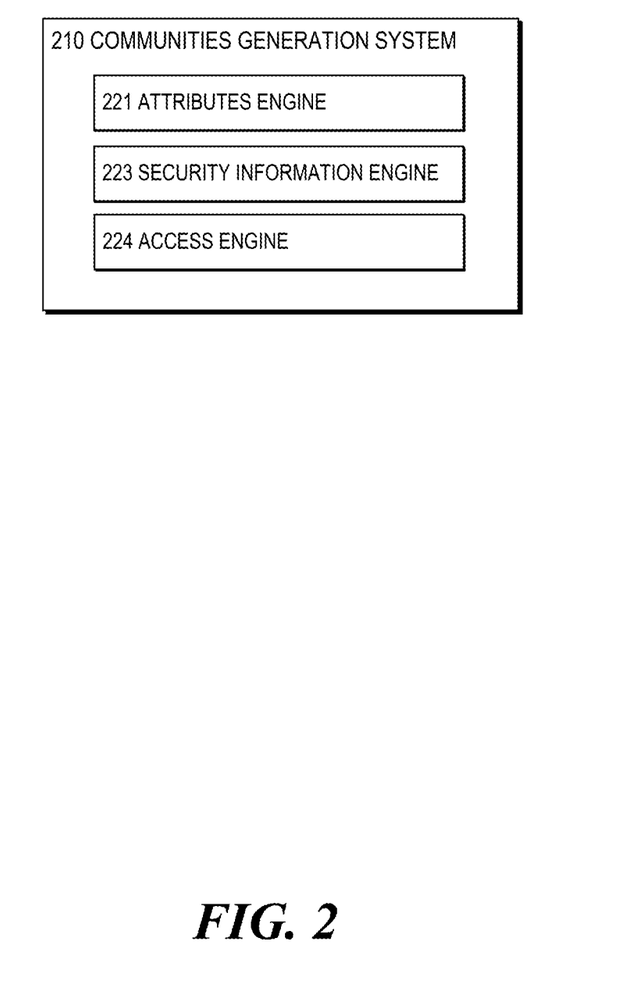
FIG. 2 is a block diagram depicting an example communities generation system.

FIG. 2 is a block diagram depicting an example communities generation system 210. Communities generation system 210 may comprise an attributes engine 221, a security information engine 223, an access engine 224, and/or other engines. Engines 221, 223, and 224 represent engines 121, 123, and 124, respectively.

Figure 3:
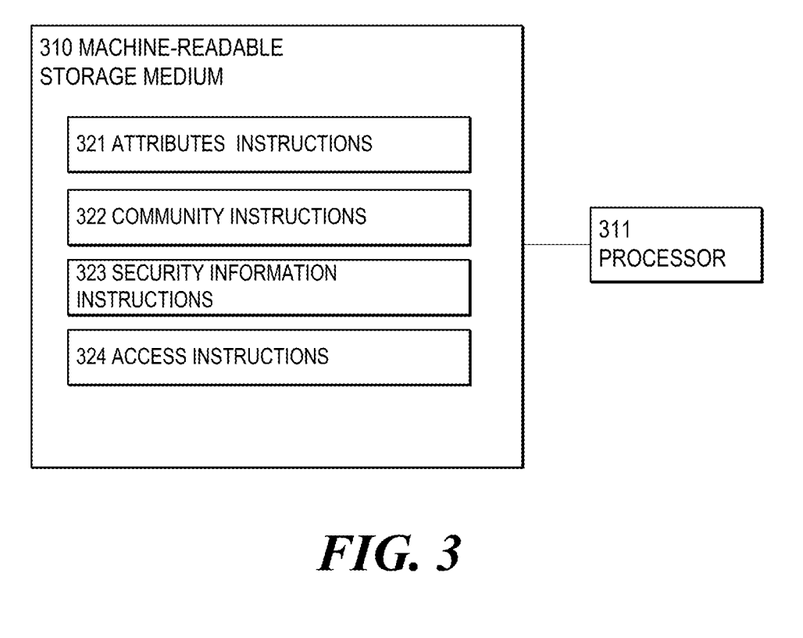
FIG. 3 is a block diagram depicting an example machine-readable storage medium comprising instructions executable by a processor for generating communities on a security information sharing platform.

FIG. 3 is a block diagram depicting an example machine-readable storage medium 310 comprising instructions executable by a processor for generating communities on a security information sharing platform.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements communities generation system 110 of FIG. 1.

In FIG. 3, the executable program instructions in machine-readable storage medium 310 are depicted as attributes instructions 321, community instructions 322, security information instructions 323, and access instructions 324. Instructions 321-324 represent program instructions that, when executed, cause processor 311 to implement engines 121-124, respectively.

Figure 4:
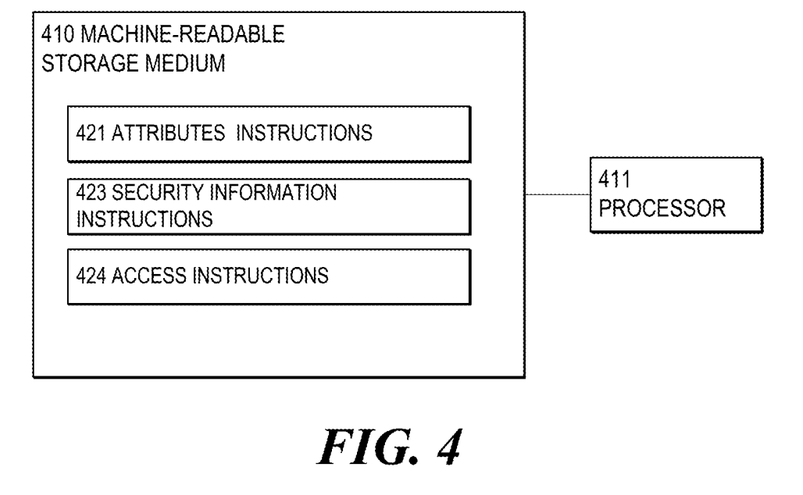
FIG. 4 is a block diagram depicting an example machine-readable storage medium comprising instructions executable by a processor for generating communities on a security information sharing platform.

FIG. 4 is a block diagram depicting an example machine-readable storage medium 410 comprising instructions executable by a processor for generating communities on a security information sharing platform.

Referring to FIG. 4, the programming may be processor executable instructions 421, 423, and 424 stored on a machine-readable storage medium 410 and the hardware may include a processor 411 for executing those instructions. Thus, machine-readable storage medium 410 can be said to store program instructions or code that when executed by processor 411 implements communities generation system 110 of FIG. 1.

In FIG. 4, the executable program instructions in machine-readable storage medium 410 are depicted as attribute instructions 421, security information instructions 423, and access instructions 424. Instructions 421, 423, and 424 represent program instructions that, when executed, cause processor 411 to implement engines 121, 123, and 124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement communities generation system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-325, and/or other instructions. As an alternative or in addition to retrieving and executing instructions, processor 311 may include at least one electronic circuit comprising a number of electronic components for performing the functionality of at least one of instructions 321-325, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421 and 425, and/or other instructions. As an alternative or in addition to retrieving and executing instructions, processor 411 may include at least one electronic circuit comprising a number of electronic components for performing the functionality of at least one of instructions 421 and 425, and/or other instructions.

Figure 5:
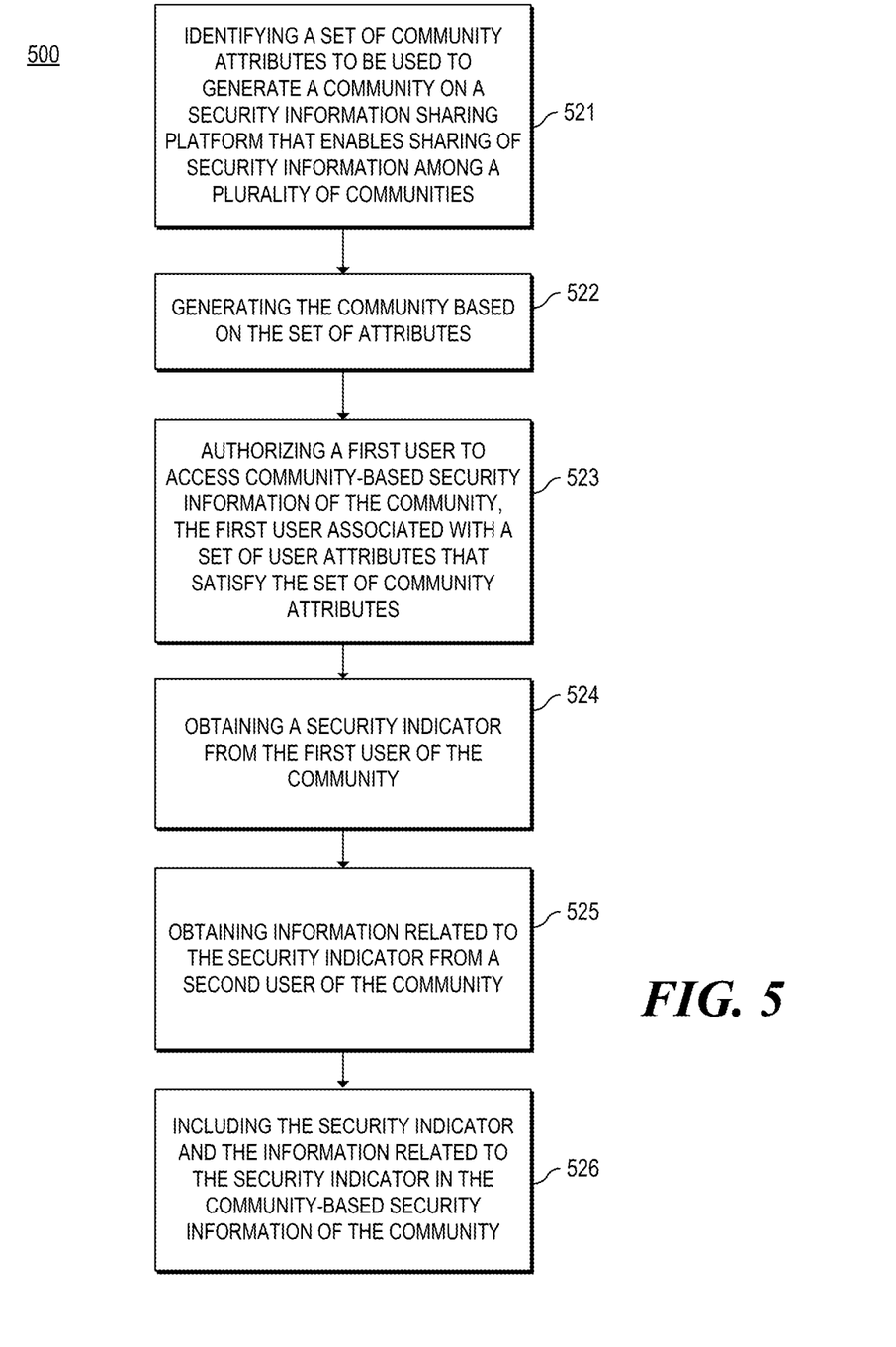
FIG. 5 is a flow diagram depicting an example method for generating communities on a security information sharing platform.

FIG. 5 is a flow diagram depicting an example method 500 for generating communities on a security information sharing platform. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include identifying a set of community attributes to be used to generate a community on a security information sharing platform that enables sharing of security information among a plurality of communities. Referring back to FIG. 1, attributes engine 121 may be responsible for implementing block 521.

In block 522, method 500 may include generating the community based on the set of attributes. Referring back to FIG. 1, community engine 122 may be responsible for implementing block 522.

In block 523, method 500 may include authorizing a first user to access community-based security information of the community, wherein the first user is associated with a set of user attributes that satisfy the set of community attributes. Referring back to FIG. 1, access engine 124 may be responsible for implementing block 523.

In block 524, method 500 may include obtaining a security indicator from the first user of the community. Referring back to FIG. 1, security information engine 123 may be responsible for implementing block 524.

In block 525, method 500 may include obtaining information related to the security indicator from a second user of the community. Referring back to FIG. 1, security information engine 123 may be responsible for implementing block 525.

In block 526, method 500 may include including the security indicator and the information related to the security indicator in the community-based security information of the community. Referring back to FIG. 1, security information engine 123 may be responsible for implementing block 526.

Figure 6:
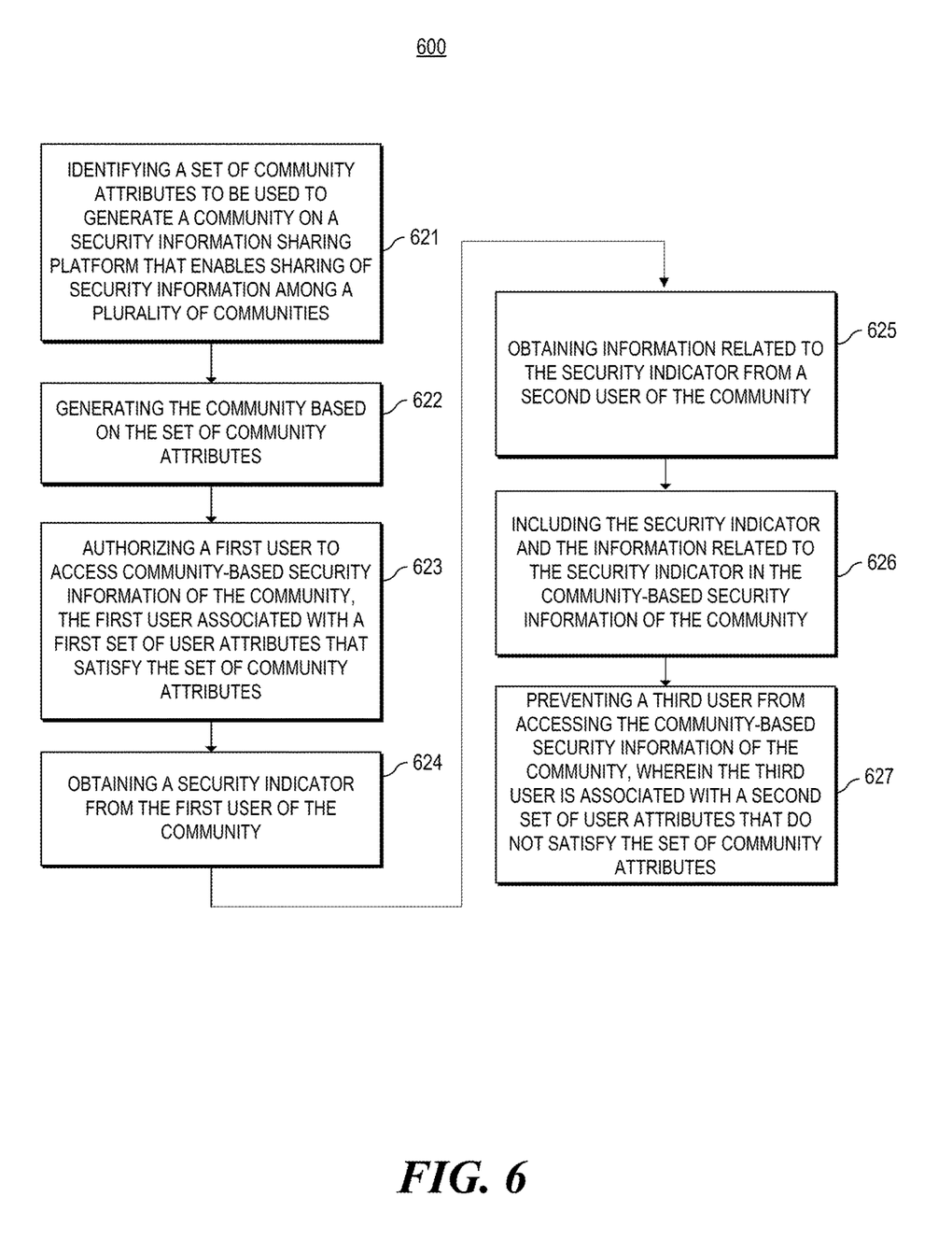
FIG. 6 is a flow diagram depicting an example method for generating communities on a security information sharing platform.

FIG. 6 is a flow diagram depicting an example method 600 for generating communities on a security information sharing platform. Method 600 as illustrated (and described in greater detail below) is meant to be an example and, as such, should not be viewed as limiting. Method 600 may be implemented in the form of executable instructions stored on a machine-readable storage medium, such as storage medium 210, and/or in the form of electronic circuitry.

In block 621, method 600 may include identifying a set of community attributes to be used to generate a community on a security information sharing platform that enables sharing of security information among a plurality of communities. Referring back to FIG. 1, attributes engine 121 may be responsible for implementing block 621.

In block 622, method 600 may include generating the community based on the set of community attributes. Referring back to FIG. 1, community engine 122 may be responsible for implementing block 622.

In block 623, method 600 may include authorizing a first user to access community-based security information of the community, wherein the first user is associated with a first set of user attributes that satisfy the set of community attributes. Referring back to FIG. 1, access engine 124 may be responsible for implementing block 623.

In block 624, method 600 may include obtaining a security indicator from the first user of the community. Referring back to FIG. 1, security information engine 123 may be responsible for implementing block 624.

In block 625, method 600 may include obtaining information related to the security indicator from a second user of the community. Referring back to FIG. 1, security information engine 123 may be responsible for implementing block 625.

In block 626, method 600 may include including the security indicator and the information related to the security indicator in the community-based security information of the community. Referring back to FIG. 1, security information engine 123 may be responsible for implementing block 626.

In block 627, method 600 may include preventing a third user from accessing the community-based security information of the community, wherein the third user is associated with a second set of user attributes that do not satisfy the set of community attributes. Referring back to FIG. 1, access engine 124 may be responsible for implementing block 627.

The foregoing disclosure describes a number of example implementations for generating communities on a security information sharing platform. The disclosed examples may include systems, devices, computer-readable storage media, and methods for generating communities on a security information sharing platform. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
identifying a first set of community attributes to be used to generate a first community on a security information sharing platform that enables sharing of security information among a plurality of communities;
generating the first community based on the first set of community attributes;
authorizing a first user to access community-based security information of the first community, the first user associated with a first set of user attributes that satisfy the first set of community attributes, wherein the authorization comprises, in response to a request from the first user to access the community-based security information, determine whether the community-based security information is accessible by the first user based on determining whether the first user is associated with the first set of user attributes and a result of voting by users of the first community;
obtaining a first security indicator from the first user;
obtaining information related to the first security indicator from a second user of the first community; and
including the first security indicator and the information related to the first security indicator in the community-based security information.

2. The method of claim 1, wherein the first security indicator comprises at least one of: an Internet Protocol (IP) address, a domain name, an e-mail address, a Uniform Resource Locator (URL), and a software file hash.

3. The method of claim 1, wherein the information related to the first security indicator comprises at least one of: an investigation result that is provided by the second user for the first security indicator, an indicator score for the first security indicator, a source for the first security indicator, and a threat actor for the first security indicator.

4. The method of claim 1, further comprising:
determining whether to authorize the first user to access the community-based security information based on user credentials of the first user.

5. The method of claim 1, further comprising:
preventing a third user from accessing the community-based security information, wherein the third user is associated with a second set of user attributes that do not satisfy the first set of community attributes.

6. The method of claim 1, further comprising:
identifying a second set of community attributes to be used to generate a second community on the security information sharing platform;
generating the second community based on the second set of community attributes;
authorizing the first user to access community-based security information of the second community, the first user associated with the first set of user attributes that satisfy the second set of community attributes;
obtaining a second security indicator from the first user of the second community;
obtaining information related to the second security indicator from a third user of the second community; and
including the second security indicator and the information related to the second security indicator in the community-based security information of the second community.

7. A non-transitory machine-readable storage medium comprising instructions executable by a processor of a computing device, the non-transitory machine-readable storage medium comprising:
instructions to identify a set of community attributes to be used to generate a first community on a security information sharing platform that enables sharing of security information among a plurality of communities;
instructions to receive, from a first user, a request to access community-based security information of the first community;
instructions to, in response to the request, determine whether the community-based security information is accessible by the first user based on determining whether the first user is associated with a first set of user attributes that satisfy the set of community attributes;
instructions to, in response to determining that the community-based security information is accessible by the first user, obtain a security indicator from the first user;
instructions to obtain information related to the security indicator from a second user of the first community;
instructions to include the security indicator and the information related to the security indicator in the community-based security information; and
instructions to authorize a third user to access the community-based security information based on a result of voting by the first and second users, wherein the third user is associated with a second set of user attributes that do not satisfy the set of community attributes.

8. The non-transitory machine-readable storage medium of claim 7, wherein the first set of user attributes comprise a user attribute related to at least one of: an industry sector of the first user, a geographical region of the first user, an organization that the first user belongs to, user reputation of the first user, a citizenship status of the first user, an environmental condition, an indication of whether the first user represents a threat intelligence feed vendor, a security clearance level of the first user, and user status of the first user in the security information sharing platform.

9. The non-transitory machine-readable storage medium of claim 7, further comprising:
  instructions to assign the first set of user attributes to the first user by:
   (i) allowing the first user to specify at least one user attribute of the first set of user attributes that describes the first user;
   (ii) extracting at least one user attribute of the first set of user attributes from a user profile of the first user; or
   (iii) allowing the third user to assign at least one user attribute of the first set of user attributes to the first user.

10. The non-transitory machine-readable storage medium of claim 7, further comprising:
  instructions to cause the first set of user attributes to be hidden from the first user.

11. The non-transitory machine-readable storage medium of claim 7, wherein the information related to the security indicator comprises at least one of: an investigation result that is provided by the second user for the security indicator, an indicator score for the security indicator, a source for the security indicator, and a threat actor for the security indicator.

12. A system comprising:
  a hardware processor to:
   identify a first set of community attributes that describe users to be included in a first community on a security information sharing platform that enables sharing of security information among a plurality of communities;
   identify a second set of community attributes that describe users to be included in a second community on the security information sharing platform;
   authorize a first user to access community-based security information of the first community, the first user associated with a first set of user attributes that satisfy the first set of community attributes and that do not satisfy the second set of community attributes, wherein the authorization comprises, in response to a request from the first user to access the community-based security information, determine whether the community-based security information is accessible by the first user based on determining whether the first user is associated with the first set of user attributes and a result of voting by users of the first community;
   prevent the first user from accessing community-based security information of the second community;
   obtain a first security indicator from the first user;
   obtain information related to the first security indicator from a second user of the first community; and
   include the first security indicator and the information related to the first security indicator in the community-based security information of the first community.

13. The system of claim 12, wherein the hardware processor is further to:
   authorize a third user to access the community-based security information of the second community, the third user associated with a second set of user attributes that satisfy the second set of community attributes;
   obtain a second security indicator from the third user of the second community;
   obtain information related to the second security indicator from a fourth user of the second community; and
   include the second security indicator and the information related to the second security indicator in the community-based security information of the second community.

14. The system of claim 12, wherein an identification of the first user is hidden from the second user.

15. The system of claim 12, wherein the first set of community attributes is in a form of a monotonic expression.

* * * * *